US008877306B2

(12) United States Patent
Ajbani

(10) Patent No.: US 8,877,306 B2
(45) Date of Patent: Nov. 4, 2014

(54) COMPATIBALIZED BLENDS OF POLYPHENYLENE SULFIDE AND THERMOPLASTIC VULCANIZATE

(76) Inventor: Manoj Ajbani, Mason, OH (US)

( * ) Notice: Subject to any disclaimer, the term of this patent is extended or adjusted under 35 U.S.C. 154(b) by 1031 days.

(21) Appl. No.: 12/281,649

(22) PCT Filed: Mar. 9, 2006

(86) PCT No.: PCT/US2006/008532
§ 371 (c)(1),
(2), (4) Date: Sep. 4, 2008

(87) PCT Pub. No.: WO2007/102826
PCT Pub. Date: Sep. 13, 2007

(65) Prior Publication Data
US 2009/0011163 A1 Jan. 8, 2009

(51) Int. Cl.
*B29D 22/00* (2006.01)
*B29D 23/00* (2006.01)
*C08F 283/00* (2006.01)
*C08L 81/02* (2006.01)

(52) U.S. Cl.
CPC ............ *C08F 283/00* (2013.01); *C08L 81/02* (2013.01)
USPC .......... 428/35.7; 428/36.8; 428/36.9; 522/73; 522/109; 522/110

(58) Field of Classification Search
USPC .............. 522/178, 73, 109, 110; 525/66, 191; 428/35.7, 36.8, 36.9
See application file for complete search history.

(56) References Cited

U.S. PATENT DOCUMENTS

| | | | |
|---|---|---|---|
| 3,354,129 A | 11/1967 | Edmonds, Jr. et al. | |
| 3,919,177 A | 11/1975 | Campbell | |
| 4,337,329 A | 6/1982 | Kubo et al. | |
| 4,368,321 A | 1/1983 | Sherk et al. | |
| 4,371,671 A | 2/1983 | Anderson | |
| 4,384,081 A | 5/1983 | Kubo et al. | |
| 4,452,951 A | 6/1984 | Kubo et al. | |
| 4,464,515 A | 8/1984 | Rempel et al. | |
| 4,503,196 A | 3/1985 | Rempel et al. | |
| 4,581,417 A | 4/1986 | Buding et al. | |
| 4,814,430 A | 3/1989 | Iwasaki et al. | |
| 4,889,893 A | 12/1989 | Kobayashi et al. | |
| 5,006,605 A | 4/1991 | Mizuno et al. | |
| 5,047,465 A | 9/1991 | Auerbach | |
| 5,149,731 A * | 9/1992 | Uota et al. ..................... | 524/265 |
| 5,240,973 A * | 8/1993 | Katoh et al. ................... | 522/73 |
| 5,248,730 A | 9/1993 | Yamao | |
| 5,380,783 A | 1/1995 | Satake et al. | |
| 5,397,839 A | 3/1995 | Patel | |
| 5,589,544 A | 12/1996 | Horrion | |
| 5,652,287 A | 7/1997 | Sullivan | |
| 5,654,358 A | 8/1997 | Kadoi et al. | |
| 5,817,723 A * | 10/1998 | Flexman et al. ............... | 525/480 |
| 5,837,758 A | 11/1998 | Brown et al. | |
| 5,840,830 A | 11/1998 | Miyahara et al. | |
| 6,015,858 A | 1/2000 | Gornowicz | |
| 6,020,431 A | 2/2000 | Venkataswamy et al. | |
| 6,117,950 A * | 9/2000 | Yamao et al. .................. | 525/423 |
| 6,281,286 B1 * | 8/2001 | Chorvath et al. ............. | 524/862 |
| 6,362,287 B1 | 3/2002 | Chorvath et al. | |
| 6,417,293 B1 | 7/2002 | Chorvath et al. | |
| 6,538,071 B1 | 3/2003 | Fuchs | |
| 6,569,955 B1 * | 5/2003 | Brewer et al. .................. | 525/431 |
| 6,569,958 B1 | 5/2003 | Gross et al. | |
| 6,608,136 B1 | 8/2003 | Dean et al. | |
| 6,649,704 B2 | 11/2003 | Brewer et al. | |
| 6,657,014 B1 | 12/2003 | Mori et al. | |
| 6,699,946 B1 | 3/2004 | Lambla et al. | |
| 6,713,569 B2 | 3/2004 | Chorvath et al. | |
| 6,743,868 B2 | 6/2004 | Fournier et al. | |
| 6,875,517 B2 * | 4/2005 | Bosshammer et al. ........ | 428/447 |
| 6,888,719 B1 | 5/2005 | Janzen et al. | |
| 7,132,141 B2 * | 11/2006 | Thullen et al. .............. | 428/36.91 |
| 2003/0232207 A1 * | 12/2003 | Thullen et al. .............. | 428/476.3 |
| 2004/0028854 A1 * | 2/2004 | Bosshammer et al. ....... | 428/35.7 |
| 2005/0154134 A1 * | 7/2005 | Patel et al. ..................... | 525/191 |
| 2005/0208248 A1 * | 9/2005 | Ilo et al. ...................... | 428/36.91 |
| 2006/0270793 A1 | 11/2006 | Tokushige et al. | |
| 2009/0061134 A1 | 3/2009 | Ajbani et al. | |

FOREIGN PATENT DOCUMENTS

| | | |
|---|---|---|
| DE | 2539132 A1 | 3/1977 |
| DE | 3046008 A1 | 9/1981 |
| DE | 3046251 A1 | 9/1981 |
| DE | 3227650 A1 | 3/1983 |
| DE | 3329974 A1 | 2/1985 |
| EP | 0111412 A1 | 6/1984 |
| EP | 0435024 A2 | 7/1991 |
| EP | 0435024 A3 | 7/1991 |
| FR | 2540503 A1 | 8/1984 |

OTHER PUBLICATIONS

Search Report for PCT/US2006/008532 dated Jul. 3, 2007, 1 page.
International Preliminary Report on Patentability dated Sep. 9, 2008, 6 pages.

* cited by examiner

*Primary Examiner* — Ellen S Raudenbush
(74) *Attorney, Agent, or Firm* — Dority & Manning, P.A.

(57) ABSTRACT

This invention relates to a pipe for fluid transport that is comprised of a hollow cylinder having an outer wall and an aperture extending longitudinally through the cylinder, wherein the outer wall is comprised of (a) from about 60 weight percent to about 95 weight percent of a polyarylene sulfide resin, (b) from about 5 weight percent to about 40 weight percent of a thermoplastic vulcanizate, and (c) from about 3 weight percent to about 15 weight percent of a compatibilizer. The present invention also relates to an impact resistant polyarylene sulfide composition which is comprised of (a) from about 60 weight percent to about 95 weight percent of a polyarylene sulfide resin, (b) from about 5 weight percent to about 40 weight percent of a thermoplastic vulcanizate, and (c) from about 3 weight percent to about 15 weight percent of a compatibilizer.

15 Claims, No Drawings

COMPATIBALIZED BLENDS OF POLYPHENYLENE SULFIDE AND THERMOPLASTIC VULCANIZATE

BACKGROUND OF THE INVENTION

Polyphenylene sulfide (PPS) is a specific type of polyarylene sulfide (PAS) thermoplastic resin that has excellent solvent, chemical, and heat resistance. It also possesses high strength and stiffness and low elongation at yield and break. PPS is often further compounded with glass and minerals for further increasing its strength and stiffness. Since PPS is highly rigid, it is often blended with an elastomeric impact modifier to improve flexibility. However, upon modification with an impact modifier, the chemical resistance of PPS is compromised. Since PPS is melt processed at a temperature of over 280° C., the high processing temperature often destroys the elastomeric character of the impact modifier. In some cases, higher processing temperature introduces undesirable processing attributes that are related to the low thermal tolerances of many elastomeric modifiers. These undesirable attributes may be aggravated if the elastomeric modifier is functionalized and may cause gelation during the processing which can lead to surface defects in the formed articles made therewith.

U.S. Pat. No. 4,889,893 discloses a two-component PPS composition that contains an olefinic copolymer containing 60 to 99.5% of an alpha-olefin and 0.5 to 40% by weight of a glycidyl ester of an alpha, beta-unsaturated carboxylic acid. One example of the olefinic copolymer is the copolymer of ethylene and glycidyl methacrylate. The functionalized elastomer is fairly effective in improving the impact strength of PPS. However, the olefinic nature of the modifier makes it somewhat less suitable for chemical media transport applications, particularly under conditions of very high temperature. Also, since the modifier has epoxy functionality, at high temperatures, the unreacted epoxy functionality tends to self-associate and causes surface blemishes or imperfections or gels on the pipe and tube articles made therefrom.

U.S. Pat. No. 6,608,136 discloses a polyphenylene sulfide alloy composition for wire and cables that comprises 40 to 90% by weight of PPS, about 1 to about 20% of an ethylene based grafting agent with grafting groups selected from unsaturated epoxide, unsaturated isocyanate, silane, or an oxazoline, and another ethylene copolymer with carboxylic acid containing groups. Whereas some improvement in elongation in break is possible by using the two co-grafting ethylene elastomers, there is a need for an improved composition that has lower swelling in fuel media and will process better under conditions of elevated temperatures. Ethylene based elastomers have limitations for providing adequate high temperature resistance under conditions of fuel transport.

U.S. Pat. No. 6,889,719 discloses a multilayer pipe for liquid antifreeze transport that has the inner layer made of resin material having a PPS resin that may optionally contain 20 to 40% by weight of a softening material from ethylene-glycidyl methacrylate (EGMA) and ethylene-propylene copolymers. Since the modifiers are polyolefin based, such a composition has limitations for use in fuel transport under processing temperatures of elevated temperatures. Also, the EGMA based elastomer has a tendency to self associate under PPS processing conditions.

European Patent Application 435024 (A3) discloses use of hydrogenated nitrile rubber (HNBR) for impact modification of PPS. The fuel resistance of HNBR is good, however, the notched izod impact property is not adequate. Furthermore, there is need for further improvement or reduction of the swelling of the PPS composition under conditions of elevated temperatures.

Therefore, there is a need for a flexible PPS composition that has a good balance of flexibility, impact properties, processability, and good solvent resistance. There is a need for more robust and flexible PPS compositions that largely retain the high temperature chemical resistance of PPS and still have enough flexibility for utilization in making defect-free tubes and pipes for chemical media transport.

SUMMARY OF THE INVENTION

This invention relates to pipes or tubes for fluid transport that are prepared from a composition comprised of (a) from about 60 weight percent to about 95 weight percent of polyarylene sulfide resin, (b) from about 5 weight percent to about 40 weight percent of a thermoplastic vulcanizate, and (c) from about 3 weight percent to about 10 weight percent of a compatibilizer. In the practice of this invention the polyarylene sulfide will typically be polyphenylene sulfide. The pipes of this invention are of particular benefit for utilization in the conveyance of crude oil, gasoline, diesel fuel, jet fuel, kerosene, and other organic chemicals. However, the pipes of this invention can also be utilized in transporting other liquid or gaseous materials, such as water or natural gas. Pipes made with the impact resistant polyarylene sulfide compositions of this invention may be of single or multilayered construction. Since such pipes are oil resistant, light weight, and exhibit excellent high temperature stability they are an excellent option for utilization in "under the hood" automotive applications and in industrial or construction equipment. The pipes of this invention can be utilized in outdoor applications where they are exposed to the elements, such as ultraviolet light, rain, snow, and ice. Such pipes can be buried underground, installed under bodies of fresh or salt water, or can be run above ground in locations that experience cold weather, hot weather, or both.

The impact resistant polyarylene sulfide compositions of this invention are not elastomeric, but have some degree of flexibility and high impact strength. These polyarylene sulfide compositions are of particular benefit for utilization in manufacturing rigid articles that are exposed to organic chemicals including, but not limited to, oils. For these reasons, the polyarylene sulfide compositions of this invention are of particular benefit for utilization for manufacturing pipes for the conveyance of crude oil and other liquids.

Such pipe offers the advantage over conventional metal pipes of being lightweight and corrosion resistant. Accordingly, such pipes can typically be installed with greater ease and reduce labor costs. Because such pipes are corrosion resistant they are highly durable and will accordingly have a surface life which is better than that which can be attained with conventional metal pipes.

The present invention more specifically discloses an impact resistant polyarylene sulfide composition which is comprised of (a) from about 60 weight percent to about 95 weight percent of a polyarylene sulfide resin, (b) from about 5 weight percent to about 40 weight percent of a thermoplastic vulcanizate, and (c) from about 3 weight percent to about 15 weight percent of a compatibilizer.

The subject invention further reveals a pipe for fluid transport that is comprised of a hollow cylinder having an outer wall and an aperture extending longitudinally through the cylinder, wherein the outer wall is comprised of (a) from about 60 weight percent to about 95 weight percent of a polyarylene sulfide resin, (b) from about 5 weight percent to about 40 weight percent of a thermoplastic vulcanizate, and (c) from about 3 weight percent to about 15 weight percent of a compatibilizer.

DETAILED DESCRIPTION OF THE INVENTION

The polyarylene sulfide resins that can be used in the present invention are comprised of repeating units represented by the formula: —(—Ar—S—)— wherein Ar is an arylene group. Such polyarylene sulfides are characterized by having excellent high temperature properties. In fact, they have properties at 175° C. that are 80% to 90% of those exhibited at room temperature.

Examples of the arylene group include p-phenylene, m-phenylene, o-phenylene and substituted phenylene groups (wherein the substituent is an alkyl group preferably having 1 to 5 carbon atoms or a phenyl group), p,p'-diphenylene sulfone, p,p'-biphenylene, p,p'-diphenylene ether, p,p'-diphenylenecarbonyl and naphthalene groups.

Although an arylene sulfide homopolymer constituted of the same repeating units among the arylene sulfide groups described above may be used in the present invention, the use of a copolymer constituted of a plurality of repeating units different from each other is preferable in some cases with respect to the processability of the resulting composition. In particular, a substantially linear homopolymer composed of p-phenylene sulfide repeating units is preferably used.

The copolymer to be used in the present invention may be any one constituted of two or more repeating units selected from among the arylene sulfide units mentioned above. In particular, a copolymer comprising p-phenylene sulfide units and m-phenylene sulfide units is preferably used. More particularly, it is suitable with respect to heat resistance, moldability, mechanical characteristics and so on to use a substantially linear copolymer comprising at least 60 mole percent, still preferably at least 70 mole percent of p-phenylene sulfide units. Further, it is preferable that the copolymer contain 5 to 40 mole percent, still preferably 10 to 25 mole percent of m-phenylene sulfide units. The polyphenylene sulfide resin can be a block copolymer.

The polyarylene sulfide resin that can be used in practice of the present invention may be a polymer having improved molding processability by crosslinking a relatively low-molecular polymer oxidatively or thermally to increase its melt viscosity, or a substantially linear polymer prepared by the polycondensation of a monomer component mainly comprising a difunctional monomer. In many cases, the latter polymer is superior to the former with respect to the physical properties of the resulting molded article.

According to the present invention, a resin composition prepared by blending a crosslinked polyarylene sulfide resin prepared from a monomer having at least three functional groups as a part of the monomer component with the linear polymer described above may be used.

The polyarylene sulfides that are useful in the practice of this invention include polyarylene thioethers containing repeat units of the formula:

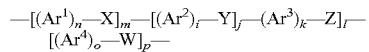

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes at least 30 mole percent, particularly at least 50 mole percent and more particularly at least 70 mole percent arylene sulfide (—S—) units. Preferably the polyarylene sulfide polymer includes at least 85 mole percent sulfide linkages attached directly to two aromatic rings. Advantageously the polyarylene sulfide polymer is polyphenylene sulfide (PPS), defined herein as containing the phenylene sulfide structure —$(C_6H_4$—$S)_n$— (wherein n is an integer of 1 or more) as a component thereof.

The polyarylene sulfide resin used in the practice of this invention will typically be polyphenylene sulfide. Synthesis techniques that can be used in making polyphenylene sulfide resins that are suitable for utilization in the practice of this invention are described in U.S. Pat. Nos. 4,814,430, 4,889,893, 5,380,783, and 5,840,830, the teachings of which are incorporated herein by reference in their entirety.

The polyarylene sulfide resin can be washed with a liquid media. For instance, the polyarylene sulfide resin can optionally be washed with water, acetone, N-methyl-2-pyrrolidone (NMP), a salt solution, an acedic media, such as acetic acid or hydrochloric acid. The polyarylene sulfide resin will typically be washed in a sequential manner that is generally known to persons skilled in the prior art.

The polyarylene sulfide thermoplastic resin that can also be used in this invention can be semi-linear, branched or slightly crosslinked. A process that can be used in making semi-linear polyarylene sulfide is described in U.S. Pat. Nos. 3,354,129, 3,919,177, 4,371,671, and 4,368,321 the teachings of which are incorporated herein by reference in their entirety.

The thermoplastic vulcanizates employed in the practice of this invention include an elastomer component and a resin component. For instance, the elastomer component can be a hydrogenated nitrile rubber, an acrylate rubber, a silicon rubber, a fluoroelastomer, or a fluoro-silicone elastomer. The resin component can be a nylon, a polyester, a polyvinylidene fluoride, a polyether ketone, a polysulfone or a polyether sulfone. In some cases it is advantageous to utilize a high temperature nylon or a polyarylene sulfide as the resin component.

U.S. Pat. Nos. 6,362,287, 6,743,868, 6,713,569, 6,649,704, 6,569,955, 6,569,958, 6,417,293, and 6,015,858 describe processes and compositions for preparing thermoplastic vulcanizates by dynamically vulcanizing or crosslinking a silicone elastomer in a thermoplastic matrix such as nylon/polyamide, polyester, and polyolefin, and are incorporated herein by reference in their entirety. The concentration of the elastomer that is dynamically mixed and vulcanized will typically exceed the level of the thermoplastic resin component of the thermoplastic vulcanizates. Higher levels of the elastomer allow for the thermoplastic vulcanizate to be elastomeric in nature and largely retractable, when applied load or stress is removed.

U.S. Pat. No. 6,020,431 describes the process and compositions for preparing thermoplastic vulcanizates by dynamically vulcanizing an acrylate rubber in a nylon matrix. The teachings of U.S. Pat. No. 6,020,431 are incorporated herein by reference in their entirety. U.S. Pat. Nos. 5,397,839 and 5,589,544 also describe the process and compositions for preparing thermoplastic vulcanizates by dynamically vulcanizing a hydrogenated nitrile rubber or a fluorinated elastomer (fluoroelastomer) in a nylon or polyolefin matrix, the teachings of which are incorporated herein by reference in their entirety.

The thermoplastic vulcanizates that are highly preferred for use in this invention contain dynamically vulcanized elastomers selected from the group of silicone, fluorosilicone, fluoro-elastomers, acrylate homo or copolymers, and hydrogenated nitrile rubbers. Hydrogenated nitrile rubbers with an acrylonitrile content of 10 to about 50% are the most preferred.

The dynamic crosslinking of the HNBR in the thermoplastic vulcanizate may be at least partially crosslinked by further addition of a carboxylated HNBR, polyhydrazide crosslinking agent, and a basic crosslinking accelerator. A specific crosslinking system that can be used is described in U.S. Pat. No. 6,657,014, the teachings of which are incorporated herein by reference in their entirety.

The HNBR may be crosslinked with peroxide systems with co-agents that are well known and that have been described in U.S. Pat. No. 6,538,071 the teachings of which are incorporated herein by reference in their entirety. The HNBR may be partially or fully crosslinked. The degree of crosslinking may be measured by measuring the gel content in an extraction testing in toluene or THF or a mixture of solvents. The gel content may be 100% for a fully crosslinked HNBR. Crosslinking of HNBR provides enhancement in the chemical and solvent resistance and elasticity.

The thermoplastic resins used to prepare the thermoplastic vulcanizates that are useful in this invention are selected from the group comprised of nylon, high temperature nylon, polyester, polyarylene sulfide or polyphenylene sulfide, polyvinyledene fluoride, liquid crystalline polyester, polyetherether ketone (PEEK), polysulfones, polyethersulfones, and polypropylene. The most preferred resins are high temperature nylons, polyesters with melting points about and over 220° C. and polyphenylene sulfide.

The compatibilizer is a compound with functional groups selected from epoxides, glycidyl methacrylate, and oxazoline. The compatibilizer may be polymeric or a low molecular weight resinous compound. The polymeric compatibilizer may be obtained by copolymerization or grafting. The polymer may be an olefinic copolymer containing 60 to about 99.5% by weight of an alpha-olefin and 0.5 to about 40% by weight of a glycidyl ester of an alpha, beta-unsaturated carboxylic acid. Such compatibilizer or modifier may also be known as a copolymer of an alpha-olefin with a glycidyl methacylate functionality. U.S. Pat. Nos. 4,889,893 and 5,149,731 describe such modifiers and the teachings of which are incorporated herein by reference in their entirety.

A preferred compatibilizer for utilization in the practice of this invention is a terpolymer of the general formula E/X/Y, wherein E represents about 55 weight percent to about 75 weight percent of the compatibilizing terpolymer, wherein X represents about 15 weight percent to about 35 weight percent of the compatibilizing terpolymer, wherein Y represents about 2 weight percent to about 15 weight percent of the compatibilizing terpolymer wherein E represents ethylene, wherein X represents an α,β-ethylenically unsaturated monomer derived from an alkylacrylate, an alkylmethacrylate, an alkyl vinyl ether, carbon dioxide, sulfur dioxide, or mixtures thereof, where the alkyl groups contain 1-12 carbon atoms, such as vinyl acetate, methylacrylate, butylacrylate, and methyl vinyl ether. X can, for example, be a moiety derived from at least one of alkyl acrylate, alkyl methacrylate, alkyl vinyl ether, carbon monoxide, sulfur dioxide, or mixtures thereof. For example, X can consist of 0 weight percent to 35 weight percent of a moiety derived from at least one alkyl acrylate, alkyl methacrylate, or mixtures thereof wherein the alkyl groups contain from 1 to about 8 carbon atoms. Y can represent an α,β-ethylenically unsaturated monomer containing a reactive group, such as epoxide, maleic anhydride, isocyanate, or oxazoline, for example, that forms a covalent bond with said first polymeric component. In one preferred embodiment, Y is selected from the group consisting of glycidyl methacrylate and glycidyl acrylate, maleic anhydride, and isocyanato-ethylmethacrylate. It is typically most preferred for Y to represent glycidyl methacrylate. Lotader® 8900 terpolymer is a highly preferred compatibilizer for utilization in the practice of this invention and is comprised of repeat units that are derived from ethylene, methyl methacrylate, and glycidyl methacrylate.

The polyarylene sulfide compounds according to the present invention may optionally have an epoxy group-containing polyolefin (EGP). The co- or ter- or higher EGP polymers may be prepared using glycidyl-functional comonomers with an olefin, further optionally other vinyl esters or (meth) acrylate comonomers. Additional examples of the epoxy group-containing polyolefin include so-called graft products by addition reaction of unsaturated glycidyl group-containing monomers to conventional olefin homopolymers and copolymers using techniques known in the art. Examples of suitable monomers for EGP are the α-olefins including ethylene, propylene, 1-butene, 1-pentene, 3-methyl-1-butene, 1-hexene, 4-methyl-1-petene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene, and 1-triacontene. One or more of these α-olefins may be used. Examples of suitable glycidyl groups are provided by esters and ethers of aliphatic glycidyl, such as allylglycidylether, vinylglycidylether, glycidyl maleate and itaconate, glycidyl acrylate and methacrylate, and also alicyclic glycidyl esters and ethers, such as 2-cyclohexene-1-glycidylether, cyclohexene-4,5-diglyxidylcarboxylate, cyclohexene-4-glycidyl carobxylate, 5-norboenene-2-methyl2-glycidyl carboxylate, and endocis-bicyclo(2,2,1)-5-heptene-2,3-diglycidyl dicaroboxylate.

Exemplary epoxy group-containing EGP copolymers include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Ethyleneglycidyl methacrylate copolymer, ethylene-ethyl acrylateglycidyl methacrylate copolymers and ethylene-vinyl acetateglycidyl methacrylate copolymer are preferred. Examples of suitable commercial EGP are the LOTADER® 8840, 8900, or 8920 grades of Arkema Inc.

The alkoxy silanes that are useful in this invention are described in U.S. Pat. No. 5,149,731, the teachings of which are incorporated herein by reference in their entirety. The alkoxysilane compound is at least one silane compound selected from the group consisting of a vinlyalkoxysilane, epoxyalkoxysilane, aminoalkoxysilane, and mercaptoalkoxysilane, aminopropyltriethoxy silane, aminopropyl trimethoxy silane, aminoethylaminopropyltriethoxy, aminoethylaminopropyltrimethoxy silane, 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl) tetramethoxy and bis(3-aminopropyl) tetraethoxy disiloxane.

The impact resistant polyarylene sulfide compositions of this invention will typically contain 60 weight percent to about 95 weight percent of the polyarylene sulfide resin, from about 5 weight percent to about 40 weight percent of the thermoplastic vulcanizates, and from about 3 weight percent to about 15 weight percent of the compatibilizer. To attain better control of polymer flow during extrusion it is typically desirable to also include from about 0.1 weight percent to about 1.5 weight percent of an alkoxy silane compound in the polyarylene sulfide composition. The impact resistant polyarylene sulfide composition will preferable contain 75 weight percent to about 95 weight percent of the polyarylene sulfide resin, from about 10 weight percent to about 30 weight percent of the thermoplastic vulcanizates, from about 5 weight percent to about 10 weight percent of the compatibilizer, and from about 0.3 weight percent to about 1 weight percent of the alkoxy silane compound. The impact resistant polyarylene sulfide composition will more preferable contain 80 weight percent to about 90 weight percent of the polyarylene sulfide resin, from about 15 weight percent to about 25 weight percent of the thermoplastic vulcanizates, from about 6 weight percent to about 8 weight percent of the compatibilizer, and from about 0.5 weight percent to about 0.7 weight percent of the alkoxy silane compound.

The initial content of diene monomer units or α-olefin monomer units in the nitrile elastomer is preferably in the range of 25% to 85% by weight, more preferably 35% to 80% by weight and especially preferably 45% to 75% by weight. Hydrogenation of nitrile copolymers is well-known (see for example, DE-A 2,539,132, DE-A 3,046,008, DE-A 3,046,251, DE-A 3,227,650, DE-A 3,329,974, EP-A 111,412, and FR-B 2,540,5030). As mentioned above the diene-nitrile elastomer used herein comprises a diene as the α-olefin and has a degree of hydrogenation, based on the C=C double bonds originating from the diene, of at least 75%, preferably of at least 95%, in particular of at least 98%. The degree of hydrogenation is determined by NMR spectroscopy and IR spectroscopy.

The polyarylene sulfide compositions of this invention are valuable in a wide variety of applications where increased impact resistance is needed along with resistance to organic solvents, such as oils. The compositions of this invention are particularly valuable for extrusion into pipes or tubes for conveyance of crude oil, gasoline, heating oil, diesel fuel, jet fuel, kerosene, natural gas, and organic chemicals. Such pipes are essentially hollow cylinders with an aperture extending longitudinally therethrough. Such pipes and tubes can be straight or can be manufactured to curve to a desired degree. Such pipes or tubes are rigid but display a limited amount of flexibility that allows them to be bent for utilization in certain applications where required. In fact, the polyphenylene sulfide composition can be formulated to allow the pipe or tubes to be wound onto large reels for storage and transportation. Such pipes or tubes can then be removed from the reel and utilized as desired. The pipes made with the polyphenylene sulfide compositions of this invention can optionally be designed to include lips for interconnection with other pipes of the same design.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1 AND COMPARATIVE EXAMPLE 2

Compositions (weight %) as listed in Table 1 were mixed in a 40 mm twin-screw extruder under temperature conditions of PPS melt processing. The temperatures on the seven extruder zones were respectively set to 260° C., 260° C., 260° C., 288° C., 299° C., 305° C., and 310° C. A throughput of 150 lbs/hour was used to produce the compositions.

TABLE 1

|  | Example 1 | Example 2 (Control) |
|---|---|---|
| Glycolube P[1] | 0.3 | 0.3 |
| TPSIV 1180-50D[2] | 20 | — |
| Lotader AX 8840[3] | 7 | 15 |
| Degussa Dynasylan Ameopure[4] | 0.3 | — |
| Fortron 0214B1[5] | 71.9 | — |
| Fortron 0317B1[6] | — | 84.2 |
| Alvinox 100[7] | 0.5 | 0.5 |
| Total | 100 | 100 |

[1]A pentaerythritol tetrastearate lubricant sold by Lonza group
[2]A thermoplastic vulcanizate of Multibase/Dow Corning that is comprised of a dynamically vulcanized/crosslinked silicone elastomer dispersed in a nylon matrix
[3]Ethylene-co-glycidyl methacrylate (EGMA) from Arkema with about 8% glicidyl methacrylate functionality
[4]Gamma-amino propyl triethoxysilane from Degussa
[5]An polyphenylene sulfide resin of nominal viscosity 1200 poise (310 C., 1200/s shear rate) manufactured by Fortron Industries and sold by Ticona Polymers
[6]A polyphenylene sulfide resin of nominal viscosity 1600 poise (310 C., 1200/s shear rate) manufactured by Fortron Industries and sold by Ticona
[7]Alvinox 100 is a phenolic antioxidant from 3V, Inc The polymeric compositions prepared in Example 1 and Comparative Example 2 where then tested to determine their stress at break, elongation at break, and weight gain in a 70:20:10 heptane:cyclohexane:toluene solution. The results of this testing are reported in Table 2.

TABLE 2

Physical Properties of compositions from Table 1

|  | Example 1 | Example 2 (Control) |
|---|---|---|
| Stress at Break (MPA) | 42.8 | 46.8 |
| Elongation @ Break % | 33.7 | 35.7 |
| % Weight Gain @ equilibrium @ 150° C. (70:20:10 heptane:cyclohexane:toluene) | 10 | 9.4 |
| Surface Characteristics | smooth | pitted |

The compositions of Example 1 and Comparative Example 2 were extruded into pipes having an outer diameter of 3.25 inches and a wall thickness of 0.12 inch. A single screw extruder of 2.5 inch size with a length to diameter ratio of 24:1 was used in the extrusion of the pipe. A temperature setting of 304.4° C. was used on the four extruder zones and temperatures of 304.4° C., 301.6° C., and 282° C., respectively, were used on the three die zones.

The composition made in Comparative Example 2 ran poorly with the pipe surface being pitted. This is attributed to the tendency of the ethylene-glycidyl methacrylate modifier to self associate and form gels.

The polymeric composition made in Example 1 exhibited improved surface appearance without the pitting that was observed in Comparative Example 2. The total modifier content in Example 1 was 27% (20% of the thermoplastic vulcanizate and 7% of the EGMA compatibilizer). The improved surface is attributed to the lowering of the EGMA content in the composition. The high loadings of thermoplastic vulcanizate are believed to be responsible for achieving the higher elongation at break. Since the silicone elastomer is crosslinked, acceptable swelling in solvent mixtures is observed even at higher loadings of the thermoplastic vulcanizates.

EXAMPLE 4 AND COMPARATIVE EXAMPLES 3, 5 AND 6

In this series of experiments polymeric compositions were again made utilizing the general procedure described with respect to Example 1. The compositions of these polymer alloys are shown in Table 3 and the physical properties of the alloys are provided by Table 4.

TABLE 3

|  | Example 3 (control) | Example 4 | Example 5 (control) | Example 6 (control) |
|---|---|---|---|---|
| Fortron 0214B1 | 74.75 | 72.2 | 72.2 | 72.2 |
| Lotader AX 8840 | 25 | 7 | — | — |
| Silquest A-187[8] | 0.25 | — | — | — |
| Silquest A-1100[9] | — | 0.5 | 0.5 | 0.5 |
| Glycolube P | — | 0.3 | 0.3 | 0.3 |
| Zeotherm100-90B[10] | — | 20 | 20 | 27 |
| Lotader 4700[11] | — | — | 7 | — |
| Total | 100 | 100 | 100 | 100 |

[8]Epoxy-silane from GE Speciality Chemicals
[9]Gamma-amino propyl triethoxysilane from Degussa
[10]A thermoplastic vulcanizate from Zeon Chemicals with dynamically vulcanized acrylate rubber dispersed in the nylon matrix
[11]Ethylene-co-maleic anhydride functionalized modifier from Arkema

TABLE 4

|  | Example 3 (Control) | Example 4 | Example 5 (Control) | Example 6 (Control) |
|---|---|---|---|---|
| Tensile Stress (MPa) | 44 | 43 | 41 | 45 |
| Tensile Elongation @ Break % | 43 | 43 | 35 | 28 |
| Weight % uptake in Brent crude oil (150° C.) | 14.7 | 5 | Not tested | Not Tested |

Table 4 demonstrates that Example 4 that was prepared with the combination of higher relative concentration of thermoplastic vulcanizate Zeotherm 100-90B (dynamically vulcanized acrylate rubber in a nylon matrix) and lower concentration of the compatibilizer Lotader AX 8840 (EGMA), when compared with the control Example 3 that was prepared with 25% EGMA, swelled to a low degree in Brent crude under elevated temperatures. Low swelling is desirable for fluid transportation at elevated temperatures. Also, Example 4 maintained the same level of elongation at break as did the Comparative Example 3. Higher flexibility is a desirable characteristic for pipe to enable it to be bent and/or spooled during installation.

In Example 5, an ethylene-co-maleic anhydride (EMA) modifier was used as a compatibilizer. It had lower elongation at break when compared with Example 4 that contained the ethylene-co-glycidyl methacrylate (EGMA) as the compatibilizer. EGMA modifier appears to be a more effective compatibilizer for the PPS and nylon containing thermoplastic vulcanizate.

Example 6 is the composition with the thermoplastic vulcanizate and does not contain the compatibilizer. Example 6 has the lowest elongation at break indicating the need for an effective compatibilizer in these blend compositions of PPS and thermoplastic vulcanizates.

While certain representative embodiments and details have been shown for the purpose of illustrating the subject invention, it will be apparent to those skilled in this art that various changes and modifications can be made therein without departing from the scope of the subject invention.

What is claimed is:

1. A pipe for fluid transport, the pipe being a hollow cylinder having an outer surface and an aperture extending longitudinally through the cylinder, wherein the outer surface of the pipe is comprised of a polyarylene sulfide composition comprising (a) from about 60 weight percent to about 95 weight percent of a polyarylene sulfide resin, (b) from about 10 weight percent to about 30 weight percent of a thermoplastic vulcanizate, the thermoplastic vulcanizate being comprised of a cross-linked elastomer dispersed in a resin matrix, the resin matrix comprising a polyarylene sulfide, wherein the concentration of the cross-linked elastomer exceeds the concentration of the polyarylene sulfide in the thermoplastic vulcanizate, and (c) from about 3 weight percent to about 15 weight percent of a compatibilizer.

2. A pipe for fluid transport as specified in claim 1, the outer surface of the pipe further comprising from about 0.1 weight percent to about 1.5 weight percent of an alkoxy silane compound.

3. A pipe for fluid transport as specified in claim 1 wherein the polyarylene sulfide resin is present at a level which is within the range of about 75 weight percent to about 95 weight percent, wherein the thermoplastic vulcanizate is present at a level which is within the range of about 10 weight percent to about 30 weight percent, and wherein the compatibilizer is present at a level which is within the range of about 5 weight percent to about 10 weight percent.

4. A pipe for fluid transport as specified in claim 2 wherein the polyarylene sulfide resin is present at a level which is within the range of about 75 weight percent to about 95 weight percent, wherein the thermoplastic vulcanizate is present at a level which is within the range of about 10 weight percent to about 30 weight percent, wherein the compatibilizer is present at a level which is within the range of about 5 weight percent to about 10 weight percent, and wherein the alkoxy silane compound is present at a level which is within the range of about 0.3 weight percent to about 1.0 weight percent.

5. A pipe for fluid transport as specified in claim 1 wherein the polyarylene sulfide resin is present at a level which is within the range of about 80 weight percent to about 90 weight percent, wherein the thermoplastic vulcanizate is present at a level which is within the range of about 15 weight percent to about 25 weight percent, and wherein the compatibilizer is present at a level which is within the range of about 6 weight percent to about 8 weight percent.

6. A pipe for fluid transport as specified in claim 2 wherein the polyarylene sulfide resin is present at a level which is within the range of about 80 weight percent to about 90 weight percent, wherein the thermoplastic vulcanizate is present at a level which is within the range of about 15 weight percent to about 25 weight percent, and wherein the compatibilizer is present at a level which is within the range of about 6 weight percent to about 8 weight percent, and wherein the alkoxy silane compound is present at a level which is within the range of about 0.5 weight percent to about 0.7 weight percent.

7. A pipe for fluid transport as specified in claim 1 wherein the elastomer component in the thermoplastic vulcanizate is selected from the group consisting of hydrogenated nitrile rubber, silicone rubber, acrylate rubber, fluoroelastomer and fluoro-silicone elastomer.

8. A pipe for fluid transport as specified in claim 7 wherein the elastomer component in the thermoplastic vulcanizate is a hydrogenated nitrile rubber.

9. A pipe for fluid transport as specified in claim 1 wherein the polyarylene sulfide resin is polyphenylene sulfide.

10. A pipe for fluid transport as specified in claim 1 wherein the compatibilizer is a compound with functional groups selected from epoxides, glycidyl methacrylate, and oxazoline.

11. A pipe for fluid transport as specified in claim 1 wherein the compatibilizer is a copolymer of ethylene and glycidyl methacrylate.

12. A pipe for fluid transport as specified in claim 2 wherein an alkoxysilane is a silane compound selected at least from the group consisting of vinlyalkoxysilanes, epoxyalkoxysilanes, aminoalkoxysilanes, and mercaptoalkoxysilanes.

13. A pipe for fluid transport as specified in claim 1, wherein the pipe is of a multilayered construction.

14. A pipe for fluid transport as specified in claim 1, wherein the cross-linked elastomer of the thermoplastic vulcanizate comprises a cross-linked silicone elastomer.

15. A pipe for fluid transport as specified in claim 1, wherein the resin matrix of the thermoplastic vulcanizate comprises a polyphenylene sulfide.

* * * * *